United States Patent
Cathey et al.

4,063,083
Dec. 13, 1977

[54] DATA COMMUNICATION SYSTEM USING LIGHT COUPLED INTERFACES

[76] Inventors: Wade Thomas Cathey, 359 Pinebrook Hills, Boulder, Colo. 80302; Burton Jordon Smith, 1557 S. Dexter Way, Denver, Colo. 80222

[21] Appl. No.: 679,022

[22] Filed: Apr. 21, 1976

[51] Int. Cl.² .............................................. H04B 9/00
[52] U.S. Cl. .................................................... 250/199
[58] Field of Search ........................................ 250/199

[56] References Cited
U.S. PATENT DOCUMENTS

| | | | |
|---|---|---|---|
| 3,319,080 | 5/1967 | Cornely et al. | 250/199 |
| 3,801,819 | 4/1974 | Ohnsorge | 250/199 |
| 3,851,167 | 11/1974 | Levine | 250/199 |

*Primary Examiner*—Richard Murray
*Attorney, Agent, or Firm*—Earl C. Hancock

[57] ABSTRACT

Data communication between spaced locations is effected by interface assemblies for each location mounted in a light path. Each interface assembly includes light sensitive and/or light emitting elements for extracting and/or adding light portions to a column of light passing along the path. In one form, a typical interface unit includes back-to-back light sensitive devices and light emitting devices on opposite sides of a planar board with light transparent apertures interspersed with these transmit/receive units in a matrix configuration. The transparent apertures are arranged to pass light originating from another location and intended for still another location along the light path without disturbance. The interfacing assemblies effectively space share the coupling light column so that data communications can be established concurrently between any of the locations particularly when the light column path is formed as a closed loop. Lens systems can be included to focus the light columns on the matrix at each interface assembly and further to collimate the light emanating from the emitter matrix for transmission to downstream stations. The interfacing assemblies can be arranged to be removable from the light path without impacting data communications between remaining interface assemblies.

22 Claims, 10 Drawing Figures

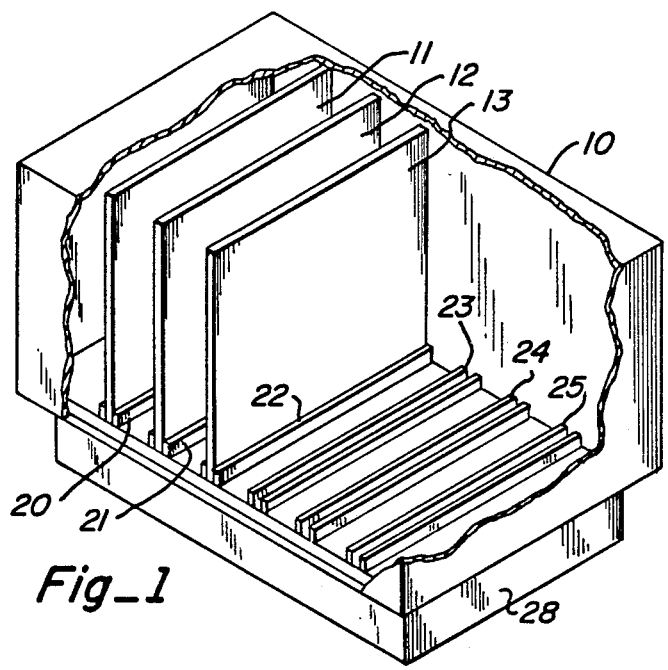
Fig_1
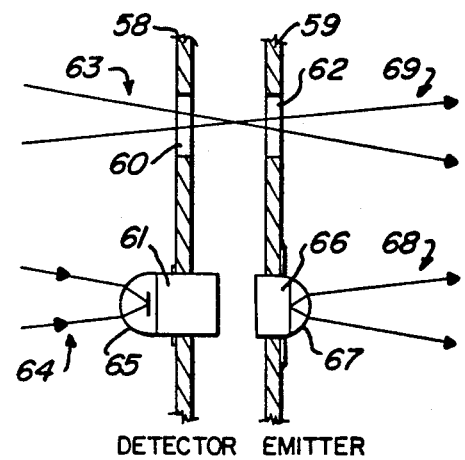
Fig_4
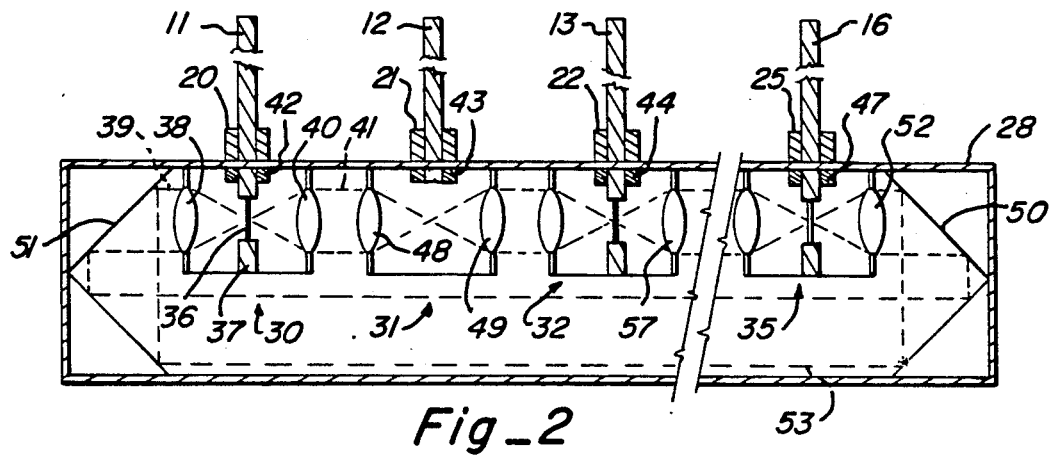
Fig_2
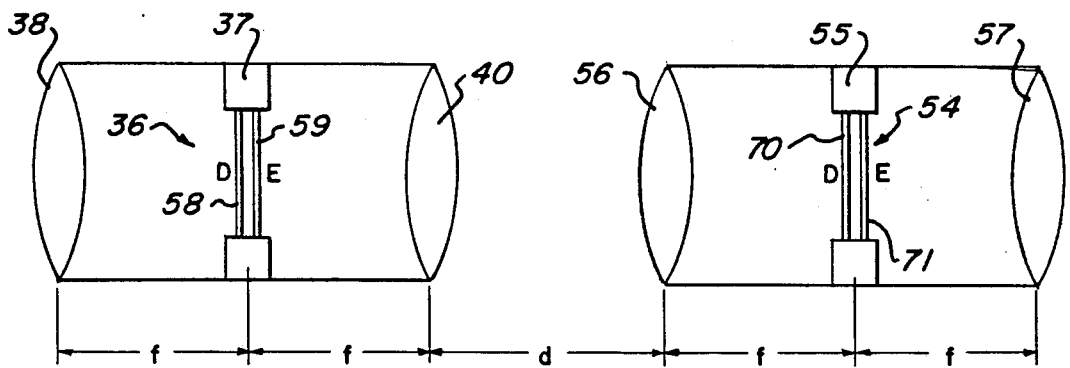
Fig_3

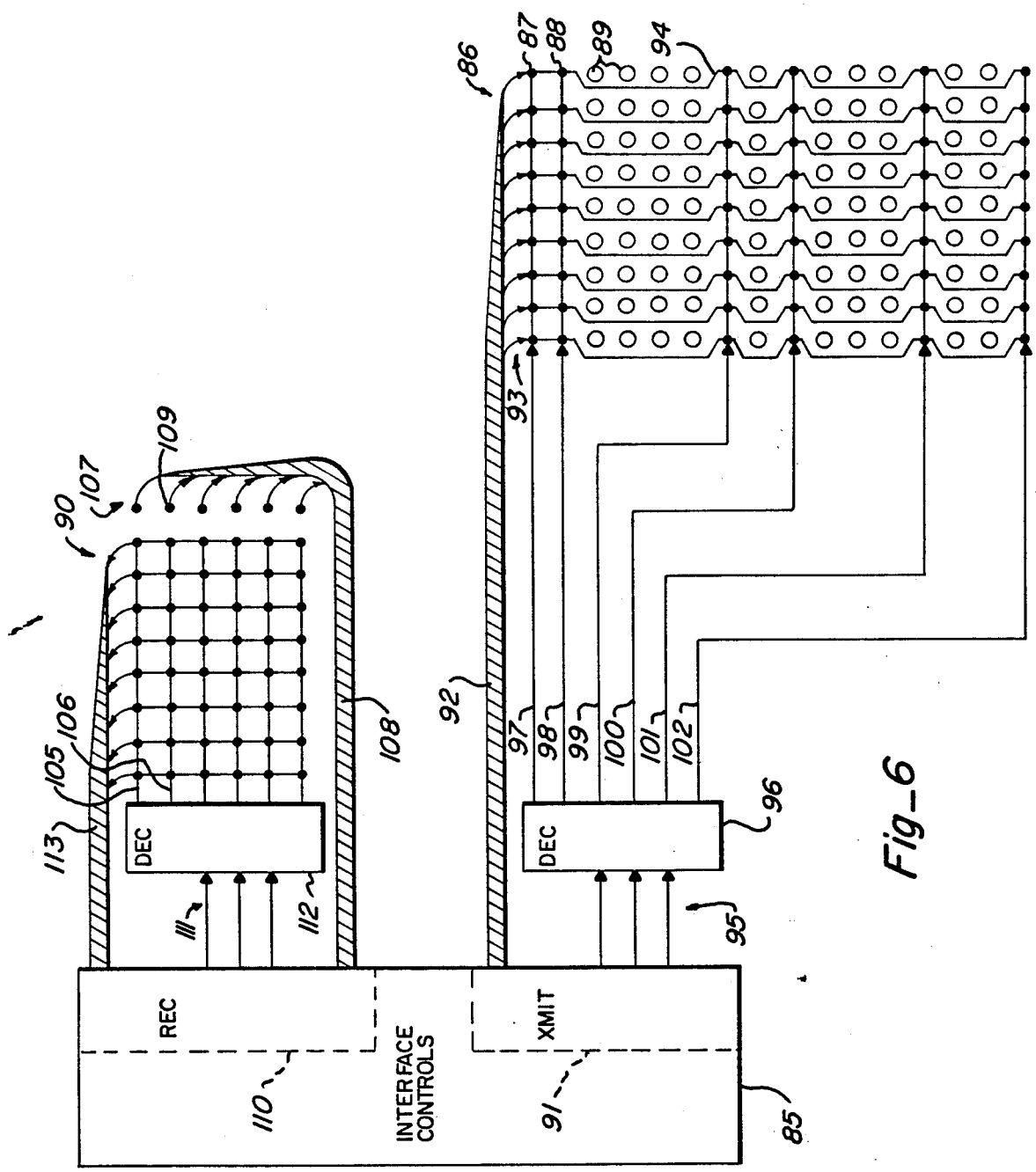

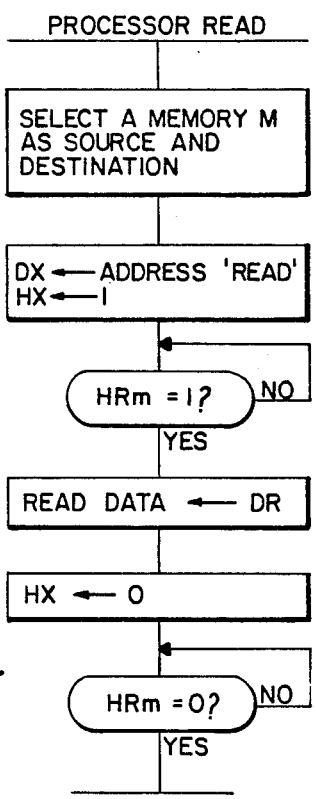
Fig_7
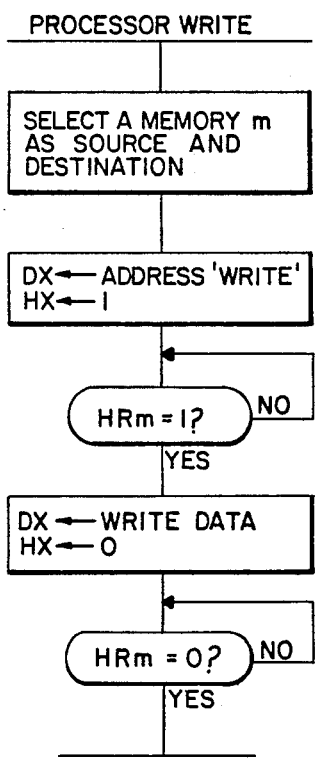
Fig_8
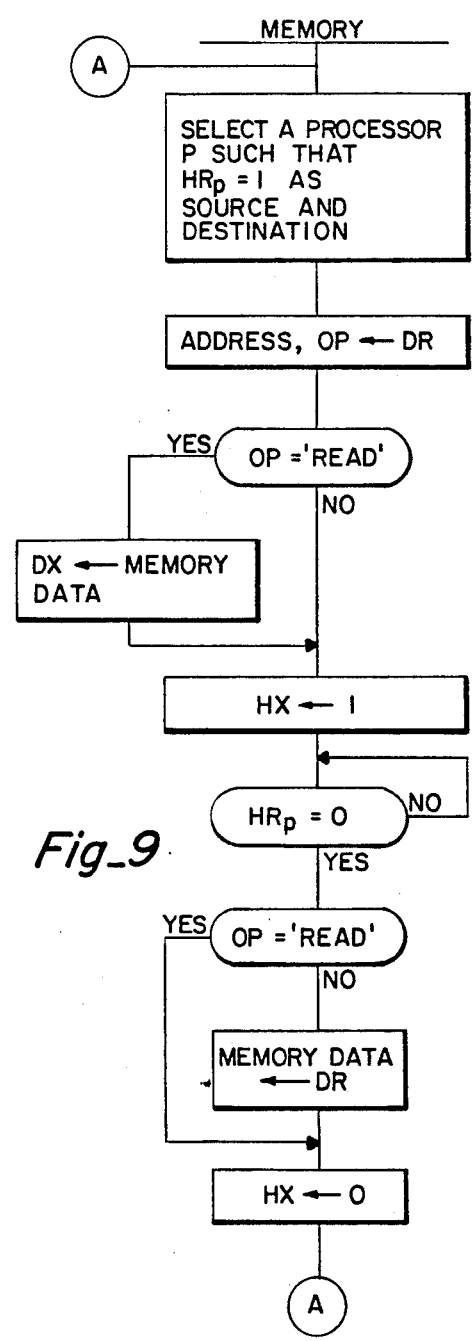
Fig_9
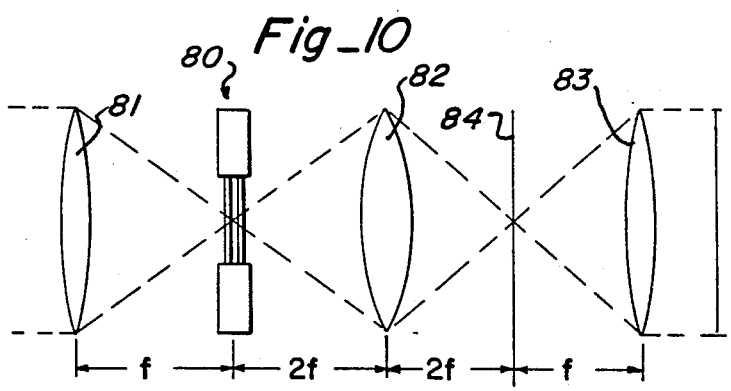
Fig_10

DATA COMMUNICATION SYSTEM USING LIGHT COUPLED INTERFACES

BACKGROUND OF THE INVENTION

The present invention relates to apparatus and methods for establishing data communication between a multiplicity of spaced locations. More particularly, the present invention relates to systems and apparatus for allowing a plurality of electronic units to establish data transmission and/or reception between those units. Although not necessarily limited thereto, the present invention is useful in establishing multiple bit data communications for discrete but spaced electronic systems, subsystems and the like which require data interfacing. That is, the present invention is useful in establishing parallel data interconnections between multiple data processing units, multiple memory units, the various elements internal to a data processing unit such as are involved in so-called virtual processor systems, multiple control units or any of a wide variety of existing electronic systems and subsystems requiring data exchanges as well as various combinations of the aforementioned units.

A remarkably wide variety of systems and subsystems have been developed in the art of electronic data processing and handling. In order for such systems to realize the efficiency and speed of operation potentially available, means for rapidly effecting data exchanges between such units have become increasingly critical. For instance, the relatively self-contained early computers have given way to more sophisticated systems such as multiple processor systems which require access to multiple discrete data storage units. Yet another example of potential multiple data communication paths are in association with the varieties of data communication control units and supervisory elements which must handle data exchanges therewith. Thus, the use of separate hard wired interconnections from each unit to all other units which must exchange data has become prohibitive.

One prior art approach to resolving the hard wired data interfacing problem is the use of a single common but multiple wired bus between all units which must effect data exchanges with some means of allowing one of the parallel attached subsystems to transmit or receive data from that common bus. Such systems frequently employ time division multiplexing on the common bus wherein the particular unit is preassigned a specific time slot during which data can be transmitted or received. Yet other arrangements such as selector channels allow a unit to request that it be granted the common bus to the exclusion of the other units with some control circuitry to supervise which unit is allowed access at a given time. As a result, the efficiency of data transmission through the common bus is necessarily reduced since concurrent communications between multiple stations is not possible.

Current data busses have the disadvantages that they are expensive and relatively slow. The direct hardwiring of such systems could be implemented through coax or fiber optics but the cost of fabricating such systems is prohibitive where parallel paths are necessary to increase the rate of data transfer. A complex digital system may be viewed as a collection of devices [e.g.: processors, memories, etc.] interconnected by switches. These switches have two significant parameters in speed as to the data transfer rate and in concurrency as to the number of separate conversations among devices which can be supported.

Some prior art time division multiplexing systems increase concurrency of the switch by sacrificing speed. They require the various conversations among devices to occur at different times. Despite the disadvantages, time-multiplex bus systems are frequently used as the input-output device switch in existing digital computer systems. Current technology limits the speed of switches to about 10 to the 8th power transfers per second with rapidly increaing difficulty of implementation for speeds above 10 to the 7th power transfers per second. Thus for speeds of 10 to the 7th power transfers per second or greater, time division multiplexing is virtually ruled out as a technique for generating concurrency and a more complex and more expensive switch must be used.

A common need for high concurrency switches exists in connection with multiple processor and multiple memory systems. In such applications, several processors may attempt to access data in several memories with only one such communication link being allowed at a given time. A system of N processors communicating with N memories via W-bit word transfers requires a switch of concurrency N to prevent lockout of processors by the switch. If the switch is located at one central location, then it requires N.W wires coming into it with the processors and the same number from the memories. If the switch is distributed throughout the system, there is still a "cut" of the system [a hypothetical plane which separates the system into component parts] which crosses N.W wires. It is predominantly the cost of connecting these wires that makes the price of high concurrency switches unreasonable. Thus there is a continuing need for a more economical way of implementing communication interconnections inexpensively.

In considering an optical switch, one approach is to model the optical system after existing systems while attempting to overcome some of the existing system limitations. A fiber system can be used in a similar manner to present systems and cross talk can be expected to be lower and system transfer rate expected to be slightly higher. There are many problems and drawbacks associated with such systems.

For instance, introduction of energy into fibers can be difficult. If light emitting diodes (LED) are used, the light is emitted into a wide cone even with a lens on the LED which results in a small fraction of the power actually being introduced into the fiber. Laser diodes could be used as high energy, high directivity sources but they are slower, more expensive and have a shorter life span. Coupling energy from the line for time-multiplex operation presents additional problems. Fiber optic couplers have been built as mentioned above, but the losses incurred by selecting light at each device requires more powerful and usually slower LEDs or more sensitive detectors or both. In addition, the couplers may introduce reflections which could be transferred to improper detectors.

The requirement for couplers assumes a time-multiplex system. A high concurrency approach could be used by letting each device have a separate fiber optic line to every other device. This solves some problems, particularly since each LED must illuminate only one detector through the fiber. Hence, low power LEDs and fast detectors could be employed. Unfortunately, the large number of interconnections for high concurrency switches creates even more severe problems for fiber optics than for conductive wires since each light guide must be carefully coupled to its devices.

It has been known in the past that light emitting devices and light sensitive devices can be arranged so as to provide communications between units. Although the light coupling elements have been used for electrical isolation between units requiring data exchanges such as in U.S. Pat. No. 3,888,772 by Neuner, such elements have likewise been used for other purposes such as in the switching matrix configuration of U.S. Pat. No. 3,078,373 by Wittenberg. There have been some efforts to employ light coupled systems for data communications between different locations. For instance, U.S. Pat. No. 3,851,167 by Levine shows an in-line receive/transmit repeater for a fiber optic cable transmission system. Other data communication systems have used various forms of optical modulation and demodulation for data communication such as in the systems shown in U.S. Pat. Nos. 3,652,858 by Kinsel and 3,899,430 by Ancker-Johnson, the latter including a laser originated closed light loop between transceiver stations. Another time-division multiplexed optical communication system including a closed loop synchronization arrangement for the optical path at the receiving station is shown in U.S. Pat. No. 3,699,344 by Rutz. Still others have suggested that lens arrangements can be used to select particular receiving detectors from transmitted light beams as in U.S. Pat. Nos. 3,679,904 Weiner and 3,739,173 by Broussaud.

In the prior art optical data communication systems, the interfacing requires relatively sophisticated modulation/demodulation apparatus and data conversion devices in order to present the data to the communicating unit requiring it. Further, many such systems suffer from essentially the same disadvantages as hard wired common bus systems since they are effectively time division multiplex dependent. Accordingly, there has been a continuing need for a data interfacing system which requires minimal modification to the existing data processing or handling units demanding the data exchanges and further with minimal apparatus associated with establishing the transmission/reception interface at each location. Still further, there has been a continuing demand for a data communication bus system which allows concurrent data exchanges between various combinations of units while avoiding the necessity for large numbers of hard wired interconnections.

SUMMARY OF THE INVENTION

The present invention is an optical data bus and interfacing assembly for communication between a plurality of data handling or processing units such as computers, memories, computer subsystem elements and the like. The present invention enjoys the advantages of having low cross talk, high transfer speed, excellent impedance matching, low manufacturing costs, flexibility for system reconfiguration and general compatibility with existing data processing or handling devices with little or no modification and further with minimal interfacing structure required. The data communication paths between devices is effectively established by space multiplexing to allow relatively simple interconnections between devices and a substantial concurrency without sacrificing economy. Multiprocessor systems incorporating large amounts of parallelism in data exchanges can be constructed at relatively low cost. The rapid switching or spectral selection associated with time or frequency multiplexed bus systems is avoided.

In general, the data interfacing in accordance with this invention is effected by imaging of an incompletely filled array of light emitting diodes onto an array consisting of photodetectors and light passing or repeating means in a board or substrate at the interfacing assembly for each location requiring data exchanges. As will be more apparent from the subsequent description, the light passing or repeating means are used to allow communication between non-adjacent stations of the system. Thus, it is possible through the present invention for every station to communicate with every other station simultaneously. The number of such simultaneous conversations is a question of architecture and the interfacing of the bus with the circuitry of the units requiring data exchanges. Each interfacing assembly can be fabricated with printed circuit boards and discrete components or by integrated circuit techniques. The emitter array can be on one side of the board or substrate, the detector array on the other, all interspersed with the transparent apertures or light detector/omitter repeater units, and the driving and interfacing electronics at the side of the array.

The interfacing structure can be configured to operate only as a light detecting and passing structure, only as a light transmitting and passing structure or both. Thus, in one implementation for a system to allow communications between a plurality of stations through a light column path, the apparatus of the present invention for establishing communication into the interface of one of the stations can include a frame mounted in a transverse relation with respect to the light column path. This frame includes a plurality of light transferring means such as detector/emitter repeater units or transparent openings or apertures therethrough for passing portions of the light column intended for other stations. One or more light sensitive elements are attached relative to this frame so as to intercept a portion of the light column intended for the associated station. Thus, the electrical output signal from these light sensitive elements indicate the intercepted light levels and can be coupled to the associated station for permitting data communication thereinto from another station.

The invention can be similarly implemented for light transmission by employing one or more light emitting elements on the frame which includes appropriate light transferring means such as detector/emitter repeater units or transparent openings or apertures so that these light emitting elements add a portion of light to the light column after passing through the light transferring means so as to produce an output light column as a composite including the portions added by the emitters. These emitters are appropriately positioned so as to ultimately illuminate a light sensitive device at another station with the local stations being coupled to selectively enenergize the light emitting elements. The light receiving and light transmitting boards can be used as separate units for a particular station in conjunction with separate or common light paths or can be effectively combined into a single, dual function board.

By including the light emitting diodes or devices on one side of a frame, board or substrate and light sensitive devices on the opposite side with appropriately interspersed transparent apertures (or equivalent) therebetween, the interfacing apparatus can be configured in a generally universal arrangement and appropriately positioned transverse to the light path so as to insure that a light circuit is established from any given station to any other station and, by including means for completing the closed loop path of the light path, each station of the system can be even arranged to communicate with itself as might be desirable for testing purposes or the like. Sets of light emitters and light sensitive devices can be arranged so that parallel bit data communications are effected between any two stations at any given time. Light from the columns received from the light path can be focused onto the array of light sensitive devices and apertures as by a lens system and light emanating from both the emitting devices and the apertures on the opposite side of the board can be collimated for transfer to subsequent stations. The interfacing board of a given location can be removed without impacting light coupling between the remaining stations. Where an input lens and output lens are used, the board itself can be removed with the lenses being left in place. Alternatively, the entire lens and board assembly can be arranged in an image compensating configuration so that this entire assembly can be removed without impacting the potential data communication paths between all of the remaining interface assemblies.

An object of the present invention is to provide a novel and improved method and apparatus for allowing data communication between a multiplicity of spaced stations.

Another object of the present invention is to provide a novel and improved apparatus and method for establishing data communication links between a multiplicity of different locations by means of collimated light coupling.

Yet another object of the present invention is to provide novel and improved methods and apparatus for establishing communications between a plurality of different locations by use of a space multiplexed light coupling bus and interfacing assemblies which intercept or pass light from the bus input and return light to the bus as passed through apertures as supplemented by light originated at the assembly for an output light column to another station.

A further object of the present invention is to provide a novel and improved apparatus and method for implementing light coupling techniques to establish data transfer interfacing for a unit or system requiring data exchanges with spaced or separate units.

Yet another object of this invention is to provide novel apparatus and methods for establishing light coupled data communications between units requiring data exchanges in a manner which is economic of manufacture and requires minimal modification of existing data processing or handling units.

A still further object of the present invention is to provide a novel and improved apparatus and method for allowing a data handling or processing location to intercept and/or add data to a light column path using space division techniques in that light column.

Yet another object of the present invention is to provide a novel and improved apparatus and methods for establishing a light coupled data interface for a data processing or handling unit which can be removably located in the light column path.

The foregoing and other objects, features, advantages and applications of the present invention will be more readily apparent in view of the following detailed description of the various exemplary preferred embodiments.

BRIEF DESCRIPTION OF THE DRAWINGS

FIG. 1 is a partially broken perspective view of an enclosure for multiple stations requiring data exchanges therebetween.

FIG. 2 is a side section and partially broken view of an optically coupled data bus implemented for the FIG. 1 enclosure.

FIG. 3 is a side view of two data interfacing assemblies illustrating the focal and spacial relationships therebetween.

FIG. 4 is a partially broken and sectioned view of a typical mounting of transmitting and receiving devices and apertures with discrete components on printed circuit boards.

FIG. 5 is a diagrammatic side view of the potential matrix arrays useful in a six-station data bus system.

FIG. 6 is a somewhat schematic view of a typical data interfacing assembly for a location and specifically illustrating one array of light emitting diodes with interspersed apertures but with the apertures omitted for the receiving light sensitive matrix.

FIG. 7 is a flow chart of a typical sequence followed by an interfacing location for a processor read operation.

FIG. 8 is a flow chart illustrating a typical sequence for a processor write operation.

FIG. 9 is a flow chart of a typical memory interfacing sequence; and

FIG. 10 illustrates an interfacing assembly including lens structure for compensating for image reversal.

DETAILED DESCRIPTION OF THE PREFERRED EMBODIMENTS

A potential operating environment for one application of the present invention is illustrated in FIG. 1 wherein a box-like enclosure 10 forms a housing for a plurality of stations depicted as printed circuit boards such as 11, 12 and 13. The printed circuit boards of this example are mounted within enclosure 10 by edge connectors 20–25. Although the components which usually are in place on the boards such as 11–13 have not been shown, it will be understand that each of these boards represents a station which requires data transfers with other stations. Accordingly, lower housing 28 encloses the light coupled data bus in accordance with the exemplary preferred embodiment and will be described in greater detail below. As will be understood, separate and distinct paths are provided without running wires or fibers between stations by use of an array of emitters imaged onto an array of detectors at other stations. In the description of the preferred embodiments, communication is assumed to be undirectional and through a closed loop light path system but it will be readily apparent that the present invention can be implemented with bidirectional systems or even with unidirectional systems with an open loop light path. That is, adjacent devices or stations such as the PC boards can communicate by light from an LED at a given position which is received by a detector at the equivalent position in one of the downstream devices in the light path. The inclusion of emitters on one side of the assembly board and detectors on the other, allows the equivalent positions to be illuminated at the detector as compared to the same position at a remote or adjacent interface assembly.

A side section and broken view of the light coupling interface contained within housing 28 is shown in FIG.

2 wherein it is assumed that interface assemblies 30-35 provide service for respective stations 11-16. Each interface assembly includes a transmit/receive matrix such as 36 shown for assembly 30 in FIGS. 2 and 3 and a mounting board such as 37 for retaining this matrix in place. Also associated with each matrix board at the interface is an input lens such as 38 adapted for receiving an input column of light shown in dotted lines at 39 and for concentrating or focusing this light on the photosensitive devices arrayed along matrix board 36. As will be further understood from the subsequent description, the matrix boards include appropriately positioned light transparent apertures which allow the light to pass therethrough and further include light emitter arrays which add portions of light to the output lens such as 40 so that the output light is recollimated for the next position as shown at 41 in FIG. 2. The appropriate electrical connections for transferring the conductivity state of the photosensitive devices on one side of the matrix board and likewise electrical connections for energizing selected emitter devices are coupled into the station location being serviced by edge connecters such as 42-44 and 47 visible in FIG. 2.

Note that the mounting board and matrix structure have been omitted for station 31 in FIG. 2. This illustrates that each matrix interfacing assembly can be constructed so as to be completely removable but, despite its absence, the light column is passed through the lenses such as 48 and 49 so as to maintain the integrity of the light path amongst the other devices. In the particular example shown, the collimated light path is closed via corner or 90° reflectors 50 and 51 which transfer the output light column from downstream lens 52 through lower return area 53 to the input lens 38. For convenience, corner reflectors 50 and 51 have been shown vertically mounted within housing 28 but they are equally suitable for horizontal mounting thereby reducing the height of housing 28.

Although the matrix boards for the exemplary preferred embodiments are shown and will be described below as employing discrete components on printed circuit board types of mounts, the present invention is particularly advantageous in that it can be implemented for interfacing matrixes through integrated circuit techniques. However, FIGS. 3 and 4 illustrate side views of the interfacing apparatus shown in FIG. 2 with stations 30 and 32 being shown in particular since FIG. 2 illustrates the absence of a matrix board at station 31. Thus, matrix 54 and its mounting board 55 for station 32 are the equivalents of matrix 36 and board 37 for station 30 and input lens 56 is the equivalent of lens 38 while output for collimating lens 57 is the equivalent of lens 40.

The generally flat frame composed of mounting board 37 and matrix 36 is positioned transversely of the light path coupling all of the stations. Each matrix such as 36 is composed of a board 58 on one side which has a plurality of light sensitive devices and apertures arrayed thereon and a second side 59 which likewise includes apertures in alignment with the apertures of board 58 but which further includes an array of light emitting devices. This is best illustrated in FIG. 4 wherein detector board 58 is shown with a light transparent aperture 60 therethrough and with a light sensitive device 61 mounted in yet another aperture. Light sensitive device 61 indicates the level of light intercepted thereby by the level of its internal electrical resistance, by a voltaically generated electric potential or current, or the like. The emitter board 59 includes an aperture 62 which is in alignment with aperture 60 so that input light as illustrated generally at 63 is focused so as to pass completely through both boards 58 and 59. However, the input portion of the light beam shown generally at 64 is intercepted by a conventional concentrating lens 65 for detection by light sensitive device 61. The conductivity state or output voltage of detector 61 can then be sensed as input data by the station associated with the matrix. In back-to-back relation with light sensitive device 65 is light emitter or LED 66 which includes a conventional focusing lens 67 to produce an output light portion shown generally at 68. Accordingly, the output light from the matrix made up of boards 58 and 59 is a composite of light passing through the apertures as shown generally at 69 and light portions added thereto such as 68 from the emitters.

In a typical implementation of the present invention and particularly using discrete components mounted as generally illustrated in FIG. 4, the light which is to pass a station proceeds through the aligned apertures 60 and 62 in the detector 58 and emitter 59 boards and focuses at a point midway between these boards. However, it is contemplated that the interfacing matrix configuration can be advantageously implemented in integrated circuits with the appropriate apertures being formed through the substrates such as by selective laser cutting. The light to be detected at a given station falls on the detector and is focused at a somewhat shorter distance by the existing detector lens 65 on the internal detector elements. The angle at which light emanates from the emitter 67 is reduced to typically between 15° and 30° at the half power points by the lens 67 on the emitter. FIG. 4 illustrates typical light ray paths along these lines. When discrete elements are used, detector 65 can typically be a Clairex CLT 3170 which has a 0.06 inch diameter and .11 inch length while emitter 66 might typically be a Motorola MLED 900 which has a 0.075 inch diameter and 0.02 inch length. However, the system is obviously not limited to use of these specific elements and in fact ideal minimization of the size involved can be implemented through integrated array techniques using known technology for such construction. For instance, a 64 × 64 array of units each including a silicon photodiode with three MOS transistors has been manufactured on a 4.9 × 4.9 millimeter chip by Integrated Photometrix Limited of Dorchester, England.

FIG. 3 illustrates that the light either passing through board 59 or emitted by devices on the emitter side ["E"] is formed into a column by lens 40 which is positioned the focal distance $f$ from the matrix mounting frame assembly. This light can then be transmitted over an arbitrary distance "d" where it is intercepted by input lens 56 as for station 32. The lens 56 then focuses the light pattern on the detector board 70 so that board 70 effectively is illuminated by a duplicate of the output light pattern along the surface of transmit board 59. Transmit board 71 for station 32 operates similarly to board 59 of station 30 and its output is collimated by lens 57 for transmission to a remote station. As seen in FIG. 2, the output light from lens 57 ultimately is passed completely around the light path shown until it reappears as an input column to lens 38. Thus, if all of the matrix boards had been removed from the appropriate stations shown in FIG. 2 with the exceptions of the boards associated with stations 30 and 32, the light pattern ultimately intercepted by input lens 38 would be a duplicate of the light pattern output produced by transmitter or emitter board 71 at station 32. As is clearly evident from FIG. 3, the lenses 38, 40, 56 and 57 are all appropriately positioned by the focal distance $f$ from the central matrix planes.

It will be recognized that there are many available techniques for achieving imaging as between stations. Thus, by reducing the distance "$d$" of FIG. 3 to 0 and employing appropriate 1:1 copy lenses, only a single lens need be used to provide the interfacing between one matrix board and its neighboring matrix board.

FIG. 5 shows a somewhat idealized section view through each of the boards of the interfacing stations referenced as I-VI which correlate to stations 30-35 of the FIG. 2 embodiment. The "0" symbols represent aperture holes through the board while the "+" symbols represent back-to-back detector/emitter combinations. Each column can be viewed as a section taken through one board, it being understood that the complete matrix for each array would be made up of equivalent emitter/detector combinations or apertures extending upwardly from the figure for as many places as parallel data transmission might dictate. The light column path is assumed to proceed from station I horizontally to station II and through the other stations to station VI until ultimately returned as by reflector apparatus 50 and 51 to station I. Thus it can be seen that the light produced by the emitter at row A for station I is not intercepted by any other device but is returned by the closed loop light path to the detector in row A for station I. It should be noted that such self energizing arrangements can be omitted if desired but can be included for uniformity of matrix cards as well as for wrap-around testing the light path at the originating location. For row B, light from the emitter for column I will be intercepted by the detector for the column II station. Conversely light from the emitters of the column II station is ultimately coupled to the detectors of the column I station.

For data communications between the stations of columns I and IV, the row P emitters and detectors are employed. In this case, note that light generated by the emitters for station I in row P passes through the aligned apertures for stations II and III without interruption and is sensed by the detectors at station IV. Similarly, the light produced by the emitters for station IV pass through the aligned apertures for stations V and VI and are detected by the station I detectors. Note further that the absence of one of the matrix boards can be determined at the originating station since light emitted by station I when board IV is absent and employing the row P devices will merely pass through the apertures of stations II, III, V and VI and likewise through the space vacated by the absent board for station IV. This light is ultimately returned to the detectors associated with the originating station I. Thus it is not necessary to include a dummy board or a board for returning "out of service" signals in the event that one of the boards is absent for any reason.

It is likewise apparent from FIG. 5 that the matrix configuration for each of the boards associated with stations I-VI are all identical in configuration except that they are each vertically and sequentially displayed by one position relative to their neighbors. Whenever two lens systems are employed as in FIGS. 2 and 3, it will be recognized that the image focused on any given matrix board is oriented in a reverse direction as compared to its orientation at the output lens of the preceding station. Thus in actual implementation, stations II, IV and VI might typically actually be inverted from their positions shown in FIG. 5 but have been shown without inversion in order to illustrate the light path coupling more clearly.

Moreover, each of the interfacing systems can include additional image reversal or compensating lenses with one example being shown in FIG. 10. Thus the interfacing matrix contained within generally flat frame assembly 80 is positioned one focal distance from the input focusing lens 81 but is positioned $2f$ from intermediate or compensating lens 82 which is further positioned a distance of $2f$ from the imaginary image plane depicted by the line 84. This image plane 84 is further spaced by $f$ from output columnating lens 83. As a result, the image intercepted by lens 81 is effectively reproduced at the output of lens 83. It can thus be seen that the entire assembly including matrix frame 80 and lenses 81-83 can be removed as a unit without impacting the image transmission along the light path whereas use of pairs of lenses as in the FIGS. 2 and 3 embodiment requires that the input and output lenses or their equivalent remain in place if the matrix frame is removed as has been shown for position 31.

FIG. 6 further illustrates typical interfacing structure associated with any of the interface assemblies for a particular location. Thus interface control 85 typically is interconnected with the utilization circuitry associated with the particular location [not shown] whatever it may be. These interface controls 85 can include any of a wide variety of different circuits which are essentially well known in the art such as so-called "hand-shaking" circuits for determining that contact has been made with a remote station, parity checking circuits, data bus controls, automatic self-testing circuitry or the like. Further, FIG. 6 shows the emitter or output array 86 including the interspersed relationship as between the emitter devices such as 87 and 88 which are interspersed with light transparent apertures such as 89. The light sensitive detector array 90 is shown without the interspersed apertures in order to simplify its presentation but it will be understood that array 90 is essentially including to array 86 included the interspersed apertures except positioned in back-to-back relation with array 86.

Whenever the location device determines that it is necessary to transmit data to another location, the transmit logic shown generally at 91 is appropriately enabled so that signals are placed on output cable 92 to energize selected ones of the vertical lines indicated generally at 93. Typically, the output line corresponding to line 94 will be energized since this establishes a service request for selecting one of the remote devices. However, a three bit pattern is placed on output lines 95 which is interpreted by conventional decoder 96 so as to enable one of lines 97-102. It can be appreciated that the enabling of appropriate light emitting diodes in the matrix 86 is therefore effectively accomplished in a generally conventional matrix switching manner. For an illustration, assume that the station shown in FIG. 6 is equivalent of station I in FIG. 5 and that communications are to be established with station II. In this case, the output enabling line 98 would be energized by decoder 96 so that all of the light emitting diodes which are concurrently enabled by vertical lines 93 will commence emitting light. Assuming the LED 88 is the flag or "handshaking" position, the remaining eight emitting diodes enabled by line 98 represent a byte or word of data for transmission to station II.

For the light sensitive detector array 90, each horizontal row of such detectors represents potentially receivable data from all of the stations and including a row coupled to line 105 which corresponds to the output from emitters enabled by line 97 for the output array 86 thus allowing the interface controls 85 to effectively talk to itself and allow loop checking of the light path. However the array of detectors connected to line 106 correspond to light intercepted after origination from station II. Further, the vertical row of light sensitive devices shown generally at 107 are introduced via cable 108 to the receiver interfacing controls 110 in interface controls 85. Thus, if station II desires to transmit data to station I of FIG. 6, the appropriate emitter of station II would be enabled and the light therefrom detected by light sensitive device 109. This input request status is transmitted through cable 108 and recognized by receiver controls 110. In the event that the interface controls 85 determine that data can be accepted, a three bit pattern is placed on input lines 111 to cause decoder 112 to enable selector line 106 thereby placing the byte of data present in matrix 90 from station II on the input cable 113 for transfer to the appropriate data handling or processing circuitry associated with interface controls 85.

It can be likewise recognized by those having normal skill in the art that the interface controls 85 can further include contention resolving circuitry as is well known. That is, since transmission requests can be present on any of the detectors in the vertical row 107, the interface controls 85 can select on an appropriate priority basis the particular station with which data communication transfers are to be allowed. Such contention resolving can be on a sequential or cyclic basis or any other prioritizing arrangement as is appropriate under the circumstances. Note that if the interfacing matrix had been removed from station II, the placing of data on the output matrix 86 via enabling line 98 and appropriate vertical lines 93 will result in this identical data appearing on the detectors associated with selection line 106 and "hand-shake" detector 109. Accordingly, a simple comparator of the data present on cables 113 and detector 109 with the data present on the output line enabled by line 98 can be used to signal to the interface controls that station II is absent. Of course further circuitry to increase assurance of the absence of station II can be included such as by requiring a sequence of random bytes of data on output lines associated with 98 and detected at the inputs of 106 and 109 if this should be necessary.

FIGS. 7, 8 and 9 present general flow chart sequences which might typically be employed if the present invention is implemented with a multiprocessor and multimemory type of a system. In these flow charts, it is assumed that each station has an M by N element data transmitting array DX and an M by N element data receiving array DR for data communications, together with an M by 1 element hand shake transmitting array HX and an M by 1 element hand shake receiving array HR for contention resolution. Assume for the sake of simplicity that there are M such stations numbered 0, 1, ... M minus 1 and that communication with station M location is accomplished merely by selecting the Mth row in the transmitting or receiving array. Thus data is sent from station "a" to station "b" by energizing the "b" row in the "a" transmit array DX and detecting the "a" row in the "b" receive array DR.

The hand shake transmitting array HX shares its row selection with the data transmitting array DX but the hand shake receiving array HR should have each of its M receiving element outputs made available to the contention resolution logic as is shown in FIG. 6. The basic idea of the contention resolution scheme is that a receiving station will examine the requests received via the HX-HR link from transmitting stations wishing to communicate with the local station. The receiving station contention logic will select a transmitting station using some scheduling discipline and inform the originator of the request that it may proceed or that the data already on the appropriate emitters at the originating location has been accepted. In a multiple processor, multiple memory system application, the memories receive requests from the processors to either read or write.

For convenience, assume that the N bit word output via DX or input via DR holds either [1] a memory address and a read/write bit, or [2] a memory data word. The Algorithms used by the processor and by each memory are shown in the flow charts of FIGS. 7-9. More particularly, FIG. 7 illustrates a typical sequence that the processor might follow in reading data from a selected memory. Thus, after the processor has determined which memory is to be selected, the appropriate read address information DX is placed on its emitter row in conjunction with enabling of its hand shaking bit HX also associated with that row. The processor then continuously monitors the hand shaking bit HRm received from the addressed memory until it detects that a return signal has been received. The processor then reads the data present on its detector array DR and disables its hand shaking bit position HX. The processor can then inspect to determine that that the addressed memory dropped its hand shaking bit HRm.

The sequence for a processor write in FIG. 8 is similar to FIG. 7 except that the processor must initially place the storage address to be used by the memory on the output array DX prior to placing the data to be written at that address on its transmission array DX. A similar sequence is followed by the memory whenever it determines that data is to be exchanged with a processor as is shown in the flow chart of FIG. 9. However, in this flow chart the received hand shaking bit is indicated as HRp.

The density of stations in the light path as shown in FIG. 2 can be increased by placing interfacing assemblies in the return path portion 53. In addition, the back-to-back arrangement of detectors and emitters either on parallel boards as shown or on opposite sides of a common substrate is preferable because this simplifies manufacture and allows use of one set of focusing lenses. However, the detector boards such as 58 and emitter boards such as 59 could be physically separated as by placing one such board in the upper light path of FIG. 2 and the other in the return path 53. Furthermore, it is obviously possible to include electronic circuitry for effecting the return loop function performed by corner reflectors 50 and 51 of FIG. 2 as by employing a matrix of all detectors at the downstream end of the light path which are connected to an equivalent plurality of emitters at the upstream initiation point of the light path via appropriate repeater amplifier circuitry and cabling.

Although a specific example of six station data communications has been shown and described, it will be recognized that any number of units can be included and that each detector/emitter matrix can be uniquely tailored at each station if desired. However, a generally universal detector/emitter matrix board can be fabricated by determining a regular matrix sequence of emitters, detectors and apertures such that appropriate transverse positioning of the matrix boards results in a complete light circuit between each pair of stations. One example of a standard sequence for such boards is to construct each board by placing active detector/emitter elements at vertical locations 0, 1, M, M+2, 2M, 2M+3 ... KM, KM+K+1 where M is the number of stations involved and k is an arbitrary whole number and further where 2K+2 is equal to or greater than M. The present invention is particularly useful in any environment where parallel data transfers and communications are required. Typical applications in addition to the multiprocessor and multimemory systems mentioned above include environments wherein simultaneous intra-processor register or element transfers are required such as in the virtual processor organization as shown in U.S. Pat. No. 3,905,025 by Davis et al which is particularly well-suited for priority-driven data acquisition and control computers. Accordingly, not only is the present invention useful for communications between generally autonomous units but is likewise applicable for reducing the amount of internal wiring required for many data processing systems or computers.

As mentioned, there are many contemporary ways in which the optical bus in accordance with the present invention can be interfaced to the data handling circuitry for the associated station thereby completing the switch. For many such systems, it is not generally possible or desirable to allow the device to simultaneously transmit to and receive from every other device because of the number of connections required at the station and the complexity of circuitry required to handle the various possible data transfers. However, the optical bus and its interfacing matrix clearly can support all or any combination of simultaneous transmit and receive operations at any given station if this should be desirable. To allow M devices to communicate simultaneously via data paths of N bits, 2N[M-1] connections to the optical interface are required. For typical values [i.e.: M = N = 16], the number of connections is 480 which generally would be considered excessive. This number can be reduced by allowing only simultaneous transmission to one of the M-1 other devices and reception from one of the M-1 other devices, a result obtained by the interfacing structure and general logic shown in FIG. 6. The number of external connections required for communications with M-1 other devices on paths of width N is 2N+2[1nM/1n2]+M+1, as shown in FIG. 6 with M = 6 and N = 8.

The service request/acknowledge structure shown in FIG. 6 and interfacing sequences illustrated in FIGS. 7-9 is adequate for many applications but any type of hand shaking sequence and detector/emitter combinations can be used as the units requiring data transfers might demand. Typically, when a device desires to send data to another, it sets destination to the address of the other device and raises output request thereby energizing one of the request emitters. At the other device, the corresponding request receiver is energized and a signal appears on the corresponding input request wire. The other device can then grant the request or not based on its own requirements. More sophisticated signaling schemes can allow several kinds of synchronization between sources and destinations.

The optical components such as the lenses can generally follow conventional practice. The alignment of the system need only be sufficiently accurate to allow repeated imaging through the holes or apertures in the matrix boards. As a general guideline, the diameter of a focusing lens and collimating lens will be approximately four times the maximum dimension of height or width for the matrix on which the image must be focused. For integrated arrays of emitters and detectors, the holes in the board will be relatively small as compared to discrete components and thus diffraction-limited lenses should be used to provide an appropriate image. The matrix boards and the frames mounting them have generally been shown in the exemplary embodiments as being flat or planar in nature. However, it will be recognized that the active elements and apertures can be constructed as portions of curved surfaces or the like as long as the proper light coupling paths are maintained.

One significant advantage of the present system as compared to common shared bus systems is that the data to be transmitted from one station to another can be concurrently introduced to the emitter array with the request signal. Accordingly, receipt of the acknowledgement signal from the target station can likewise be interpreted that the recipient station has already accepted the data placed on the output array thereby avoiding time delays associated with the hand shaking routines of shared bus systems. A still further significant advantage is that different pairs of stations can be concurrently in communication without conflict which is not possible with shared bus-type systems. Still another significant advantage is that the time delays associated with hard wired connections and the electronic circuitry associated therewith are avoided by the light coupling with its optimum speed of transmission.

The function of transferring light through a given matrix board so that an upstream station has been described herein as being effected by light transparent holes, apertures or the like. However, this function can likewise be realized through back-to-back detectors and emitters coupled to operate as direct repeaters with or without read-out to the associated station. The removability of such boards would not be affected under many circumstances particularly where the focusing lenses are left in place, the removable units include the image orientation compensating lenses or even where the proximity of mounting of the matrix boards is sufficiently close as to avoid the need for collimating and focusing lenses. If need be, dummy boards of all detector/emitter repeaters can used to produce the same result as if the board were completely removed in accordance with the prior discussion. Therefore, the terms "light transparent openings" or "light transparent apertures" is intended in the specification and claims as including detector/emitter repeater units as well as the direct light passageways through the boards.

Although the present invention has been described with particularity relative to the foregoing detailed description of the exemplary preferred embodiments, various modifications, changes, additions and applications other than those specifically mentioned herein will be readily apparent to those having normal skill in the art without departing from the spirit of this invention.

What is claimed is:

1. In a system for allowing communications between a plurality of stations through a free space light column path, apparatus for establishing a communication interface for a said station comprising:

a frame mounted in transverse relation in the light column path, said frame including a plurality of means transferring light therethrough for passing portions of the light column intended for other stations, at least one light sensitive element attached relative to said frame for intercepting a portion of the light column intended for the associated station and for producing an electrical output signal indicative of the intercepted light level, and means coupling said element electrical output signal to the associated station for permitting data communication therewith from another station.

2. Apparatus in accordance with claim 1 which includes at least one light emitting element attached to said frame on the side thereof opposite said light sensitive element, said light emitting element being positioned for adding a portion of light to the light emanating from said transferring means for transmission to another station along the light column path, said coupling means including means for selectably enabling said light emitting element by signals originating from the associated station.

3. Apparatus in accordance with claim 1 which includes a plurality of said light sensitive elements attached relative to said frame for intercepting portions of the light column originating from respective other stations, said coupling means including means for introducing said electrical output signals from said plurality of elements to the associated station.

4. Apparatus in accordance with claim 1 which includes a set of detectors including a plurality of said light sensitive elements, said set of detectors being attached relative to said frame for intercepting respective portions of the light column originating from the same other station as the portion of the light column originated for said at least one light sensitive element, said coupling means including means for interconnecting said electrical output signals from said set to the associated station in parallel whereby the associated station responds to said output signal of said at least one light sensitive element by accepting data represented by said set output signals.

5. Apparatus in accordance with claim 4 which further includes a plurality of groups of said light sensitive elements with each said group including a said at least one of said light sensitive elements and a said set of detectors, said groups being attached relative to said frame for intercepting portions of the light column originating from a respective other station.

6. Apparatus in accordance with claim 5 which includes a plurality of groups of light emitting elements with said groups being attached to said frame on the side opposite respective said groups of light sensitive elements, each said light emitting element being positioned for adding a portion of light to the emanating from said light transferring means for transmission to a light sensitive element at another station along the light column path, said coupling means including means for selectably enabling said light emitting by signals originating from the associated station.

7. Apparatus in accordance with claim 6 wherein said group of light emitting elements are positioned in back-to-back relation to respective said light sensitive element groups for transmitting light to the same other station which originates light detected by the oppositely mounted said light sensitive element group.

8. Apparatus in accordance with claim 5 which includes means focusing the light column on said frame for directing portions thereof intended for the associated station upon appropriate said light sensitive elements and for directing portions thereof intended for other stations upon respective light transferring means.

9. In a system for communicating between a plurality of stations through a light column path, apparatus for allowing one of the stations to communicate with others of the stations comprising:

a frame mounted in transverse relation in the light column path, said frame including a plurality of light transparent openings therethrough for passing portions of the light columns intended for other stations, at least one light emitting element attached relative to said frame for adding a portion of light to the light column formed in part by light passing through said openings, said element being positioned for adding light to the light columns in a portion thereof ultimately illuminating a light sensitive element on another of the stations, and means coupling signals from said one of said stations for selectably energizing said light emitting element.

10. Apparatus in accordance with claim 9 which includes a plurality of said light emitting elements for adding a plurality of portions of light to the light column with said elements being positioned so that said added plurality of light portions ultimately illuminate respective light sensitive elements on said another of the stations, said coupling means including means for selectably energizing said elements from said one of said stations.

11. Apparatus in accordance with claim 10 which includes a plurality of sets of said plurality of light emitting elements and said selectably energizing means, said sets being attached with respect to the light column for ultimately illuminating pluralities of light sensitive elements on respective other stations.

12. Apparatus in accordance with claim 9 which includes means for forming light passing through said openings and said added light portions into a column of relatively uniform cross-section for transmission to another of said stations.

13. A system for data communication between a plurality of locations each having data handling circuitry comprising:

a plurality of interfacing assemblies each including a frame having a plurality of light sensitive devices arrayed on one side, a plurality of light emitting devices arrayed on another side, and a plurality of light transparent appertures therethrough with said apertures being positioned in interspersed relation to said devices, a plurality of means mounting said frames at respective locations for defining a light path with said frames being oriented in generally transverse relation in said light path, said mounting means including means positioning each said frame so that light originating from each said light emitting device is directed upon a said light sensitive device at another said frame, said frames being positioned for passing through said apertures light originating from said light emitting devices of another said frame intended for said light sensitive devices downstream in said light path, and means at each location for electrically coupling said devices of the associated said interfacing assembly with the location data handling circuitry whereby the location handling circuitry can receive data from other locations by detecting the output signals of the associated said light sensitive devices and transmit data to other locations by selectively enabling appropriate associated said light emitting devices.

14. A system in accordance with claim 13 wherein each said mounting means includes means for removably attaching said interfacing assemblies in said light path so that said light is continuous despite the absence of a said interfacing assembly at any location.

15. A system in accordance with claim 13 wherein each said interfacing assembly includes means receiving collimated light from the upstream side of said light path for focusing portions of the light upon appropriate said light sensitive devices and said apertures, and means receiving light emanating from said light emitting devices and said apertures for forming said emanating light into a column directed towards the next said interfacing assembly along said light path.

16. A system in accordance with claim 15 which includes means completing a closed loop for said light path relative to said interfacing assemblies.

17. A system in accordance with claim 16 wherein said closed loop completing means includes means receiving said emanating light column from the last said interfacing assembly downstream in said light path for introducing said received emanating light column to the first said interfacing assembly upstream in said light path.

18. A system in accordance with claim 15 wherein said mounting means each includes means for removably attaching frame between said collimated light receiving means and said emanating light receiving means so that said light path is continuous despite the absence of a said frame at any location.

19. A system in accordance with claim 15 wherein said collimated light emanating light receiving means includes means compensating the portion of said light path between said receiving means for producing output light in the same image orientation as the input light.

20. A system in accordance with claim 19 wherein said receiving means and the associated said interfacing assembly are removably attachable in said light path so that said light path is continuous despite the absence of said receiving means and said interfacing assembly at any location.

21. A system in accordance with claim 13 wherein each said interfacing assembly includes a plurality of light transmit/receive units each including one of said light sensitive devices and one of said light emitting devices mounted in back-to-back relation on opposite sides of said frame, said, units being interspersed with said apertures in a matrix configuration, said mounting means being arranged for positioning said matrix configuration at each location in a transversely spaced relation with respect to said matrix configuration at all other locations for establishing light transmission and receiving relations between the locations.

22. A system in accordance with claim 21 wherein each of said interfacing assemblies includes a plurality of groups of said sets with each said group being arranged for receiving light from one of the other said interfacing assemblies and for transmitting light to one of the other said interfacing assemblies whereby multiple paths can be established for parallel data communications between any two locations.

* * * * *